G. R. SCRIVEN.
Improvement in Fire Places.
No. 123,518.     Fig. 1.     Patented Feb. 6, 1872.
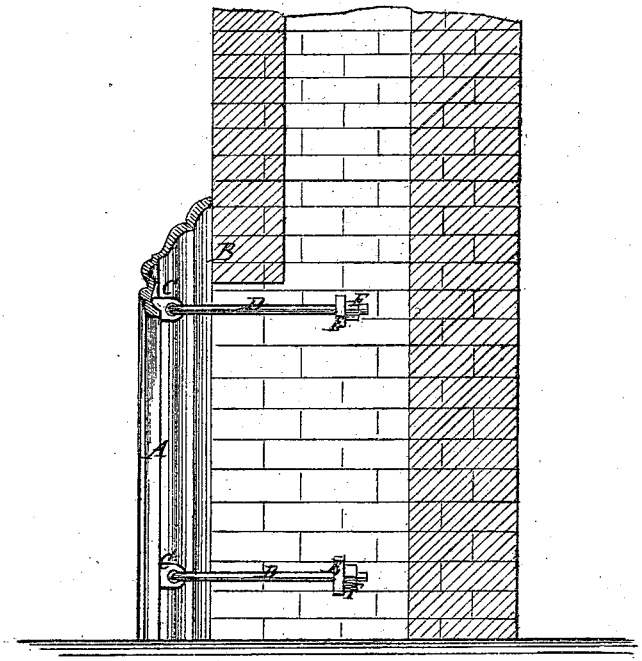
Fig. 2.
Fig. 3.
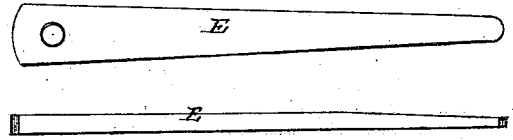

UNITED STATES PATENT OFFICE.

GARDNER R. SCRIVEN, OF HANGING ROCK, OHIO.

IMPROVEMENT IN FIRE-PLACES.

Specification forming part of Letters Patent No. 123,518, dated February 6, 1872.

Specification describing certain Improvements in Securing Fire-Place Fronts, invented by GARDNER R. SCRIVEN, of Hanging Rock, in the county of Lawrence and State of Ohio.

My invention consists in securing grate, marbleized, or other fronts for fire-places against the brick facings by bolts connected to lugs attached to the rear side of the front and eye-staples anchored in the side walls of the fire-place, the said bolts passing through the eye-bolts, and being secured by nuts, keys, or other suitable devices.

Figure 1 is a sectional elevation of a fire-place and a front, showing my improved mode of securing the said fronts. Fig. 2 is a side elevation of a bolt, showing the form which I prefer to use; and Figs. 3 and 4 show the staples I employ for connecting the bolts.

Similar letters of reference indicate corresponding parts.

A represents a grate-front, and B the fire-place-front, to which it is to be secured. C represents lugs, which I provide on the rear side of the front, preferably two on each side of the opening. D represents the bolts, which are adapted to hook into the lugs, which have an eye for the purpose. E represents the staples, anchored in the wall so that the bolts will pass through the heads, which have an eye for the purpose to receive a screw-nut, F, key, or other device for drawing the bolts and confining the fronts snugly against the wall. The lugs are cast together with the front when the latter is made of cast-metal; but when made of marble they may be connected in any way—say by anchoring in under-cut holes and securing with lead.

By preference the said lugs will be so arranged that the holes will be vertical to insure the retaining of the hook better than if horizontal.

The bolts will be made in standard sizes and lengths for each standard size of the fronts; but in case of material variations in the sizes of the fronts links may be used to connect the bolts with the fronts.

Having thus described my invention, I claim as new and desire to secure by Letters Patent—

The lugs C, bolts D, staples E, and nuts or other devices F, for securing the fire-place fronts to the walls, all arranged as and for the purpose described.

GARDNER R. SCRIVEN.

Witnesses:
J. W. WORTHINGTON,
S. T. KENYON.